(12) United States Patent
Cheng et al.

(10) Patent No.: US 8,143,537 B2
(45) Date of Patent: Mar. 27, 2012

(54) KEYBOARD

(75) Inventors: Yung-Fa Cheng, Taipei Hsien (TW); Hsiang-Lung Kao, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 234 days.

(21) Appl. No.: 12/641,341

(22) Filed: Dec. 18, 2009

(65) Prior Publication Data

US 2011/0062008 A1     Mar. 17, 2011

(30) Foreign Application Priority Data

Sep. 15, 2009    (CN) .......................... 2009 1 0306999

(51) Int. Cl.
*H01H 9/26* (2006.01)

(52) U.S. Cl. ...................................... 200/5 A

(58) Field of Classification Search .................. 200/5 A, 200/313–314, 317, 344, 512–517, 308–312, 200/315–316
See application file for complete search history.

(56) References Cited

U.S. PATENT DOCUMENTS

| | | | |
|---|---|---|---|
| 6,259,434 B1 * | 7/2001 | Tsai | 345/168 |
| 6,880,995 B2 * | 4/2005 | Cheng | 400/491.2 |
| 2008/0308397 A1 * | 12/2008 | Chou | 200/5 A |

* cited by examiner

*Primary Examiner* — Edwin A. Leon
(74) *Attorney, Agent, or Firm* — Altis Law Group, Inc.

(57) ABSTRACT

A keyboard includes a pressable structure and a plurality of keycaps. The pressable structure includes a flat member and a plurality of elastic members. The flat member defines a plurality of through holes corresponding to the plurality of the elastic members. The plurality of the elastic members is integrated with the flat member as a single element by a double injection process. The plurality of keycaps are resiliently supported by the plurality of elastic members correspondingly.

15 Claims, 4 Drawing Sheets

KEYBOARD

BACKGROUND

1. Technical Field

The present disclosure relates to inputting devices, and particularly to a keyboard.

2. Description of Related Art

Currently, traditional keyboards utilized in electronic devices, such as desktop computers, notebook computers, mobile phones, and so on, may include a plastic cap, an optional color insertion key, a wall, a conductive part, a circuit board with an air path, and so on. However, most these parts are stacked on each other, increasing the thickness of the keyboard and also susceptible to play between the parts.

Therefore, there are room for improvement in the art.

BRIEF DESCRIPTION OF THE DRAWINGS

The components of the drawings are not necessarily drawn to scale, the emphasis instead being placed upon clearly illustrating the principles of the embodiments of a keyboard. Moreover, in the drawings, like reference numerals designate corresponding parts throughout several views.

DETAILED DESCRIPTION

Figure 1:
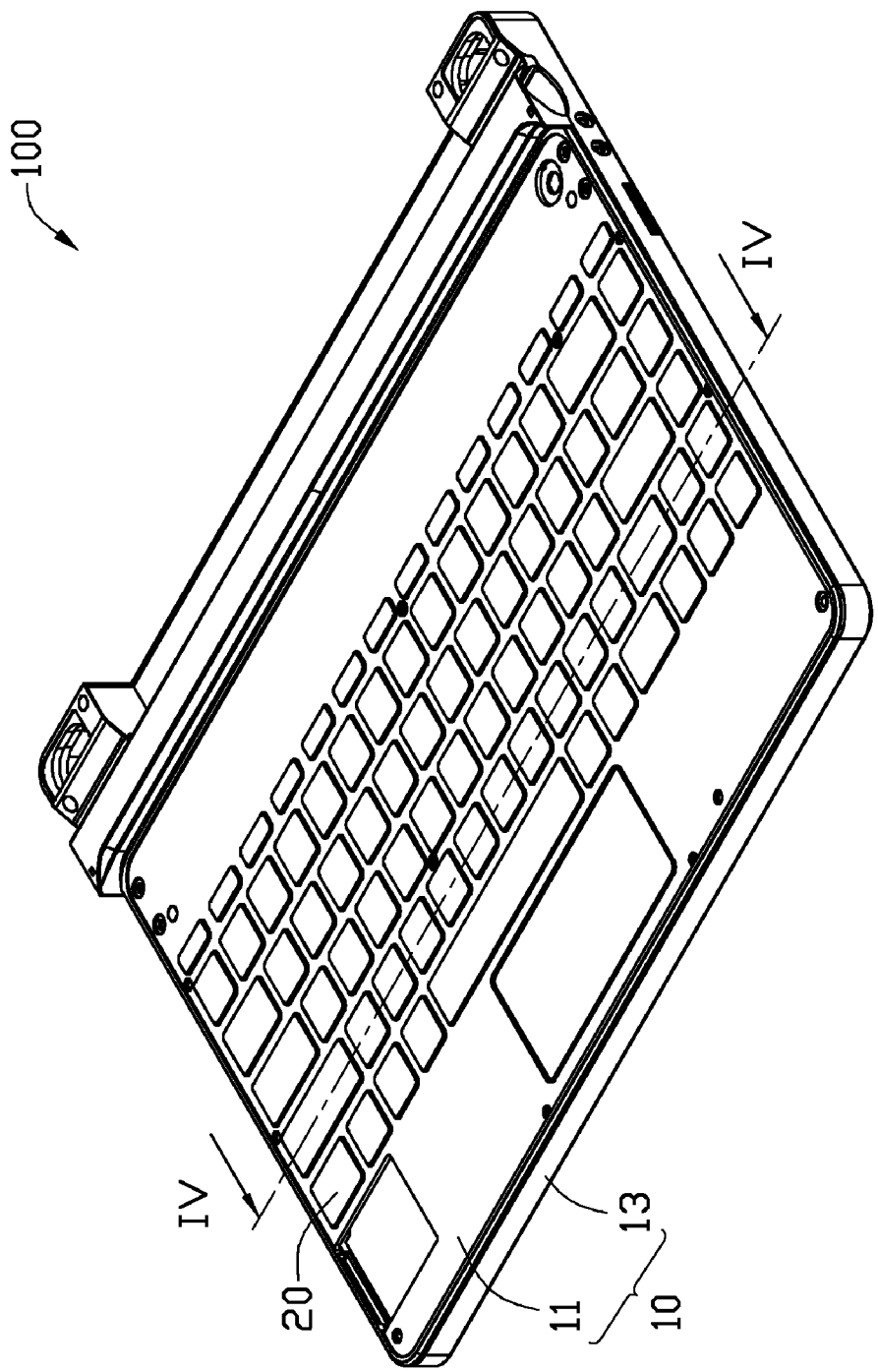
FIG. 1 is an isometric view of a keyboard according to an exemplary embodiment.
Figure 2:
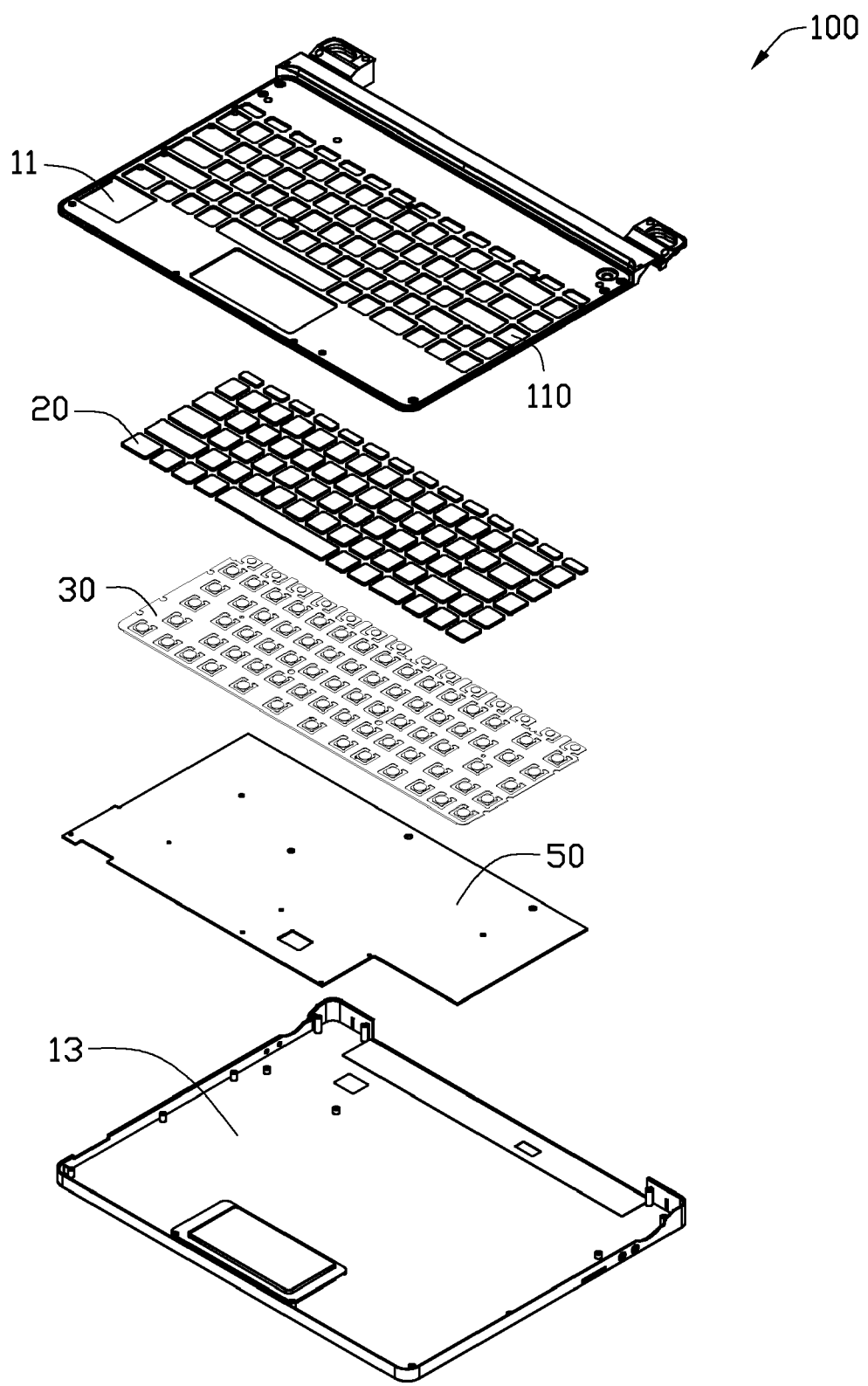
FIG. 2 is an exploded view of the keyboard of FIG. 1, including a plurality of elastic members and a flat member.

Referring to FIGS. 1 and 2, a keyboard 100 in accordance with one embodiment is illustrated. The keyboard 100 may be used as an input device in an electronic device (not shown), such as a desktop computer, a notebook computer, a mobile phone, a personal digital assistant (PDA), and so on. The keyboard 100 is operable for inputting commands and/or information into the electronic device. The keyboard 100 includes a housing 10, a plurality of keycaps 20, a pressable structure 30, and a circuit board 50.

The housing 10 includes a top cover 11 and a lower cover 13 corresponding to the top cover 11. The top cover 11 is engaged with the lower cover 13. A receiving room 15 is defined between the top cover 11 and the lower cover 13 (see FIG. 4). A plurality of through holes 110, corresponding to the plurality of the keycaps 20, are defined in the top cover 11. Each through hole 110 receives one keycap 10. In this embodiment, the housing 10 is made of plastic. In other embodiments, the housing 10 may be made of metal. The circuit board 50, the pressable structure 30, and the keycaps 20 are received in the receiving room 15.

The keycap 10 is elastically supported on the circuit board 50 by the pressable structure 30. The keycap 10 may be made of transparent or semi-transparent materials for passing and/or partially passing light. The keycap 10 may also be made of non-transparent materials, and can be also configured with transparent characters for allowing light to transmit through the transparent characters. In this embodiment, the keycap 10 is made of plastic.

Figure 3:
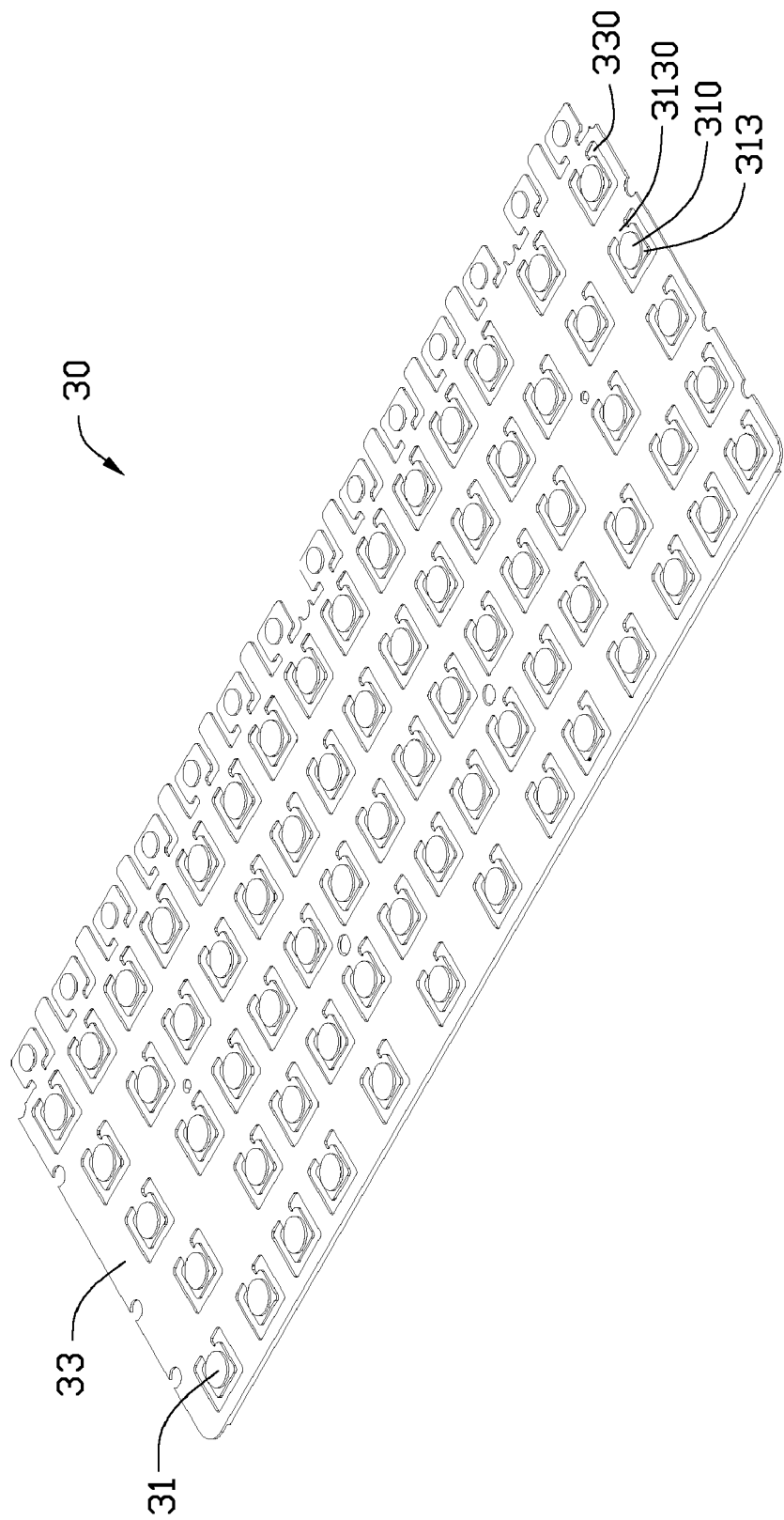
FIG. 3 is an isometric view of the plurality of elastic members and the flat member of the keyboard of FIG. 2.
Figure 4:
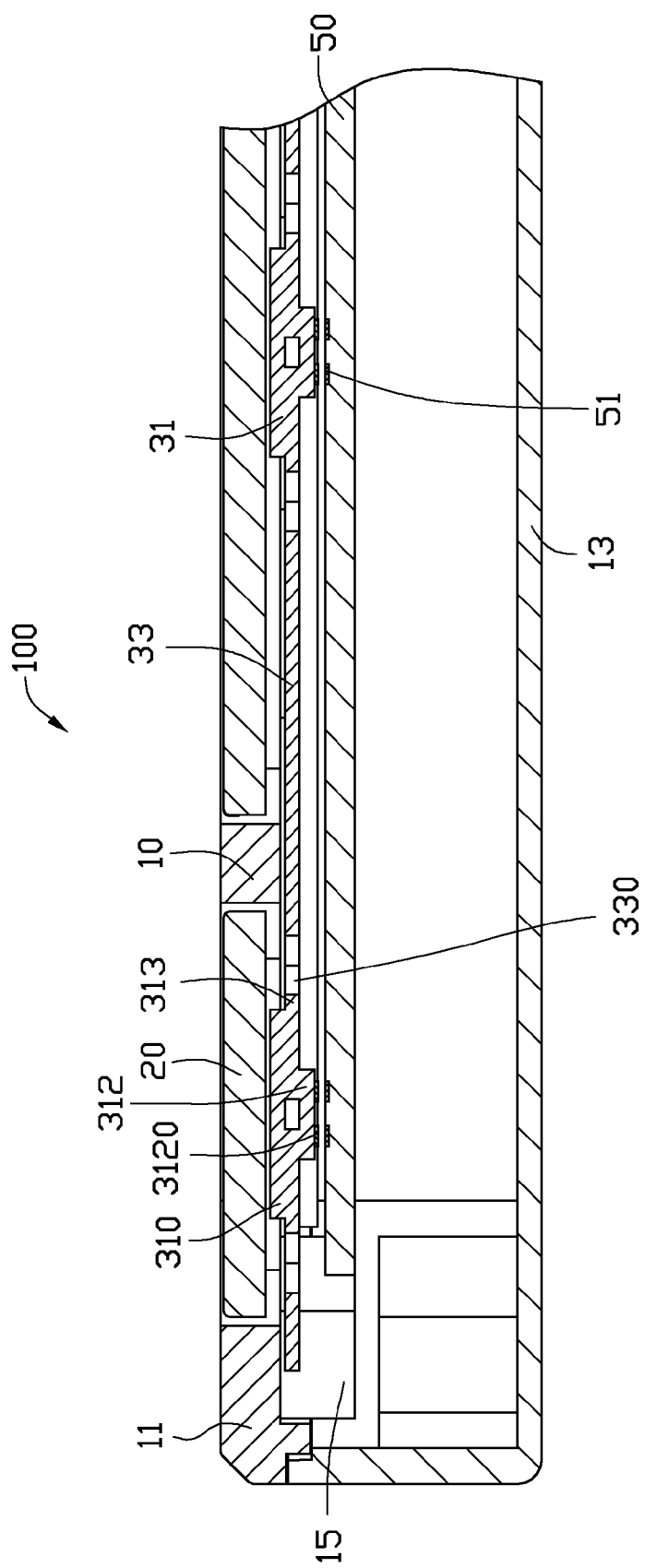
FIG. 4 is a cross-sectional view of a keyboard of FIG. 1 taken along the line IV-IV.

Referring to FIGS. 3 and 4, the pressable structure 30 is located on the circuit board 50, and includes a plurality of elastic members 31 and a flat member 33. The flat member 33 is configured for increasing the structural strength of the keyboard 100. A plurality of through recesses 330 are defined in the flat member 33. Each through recess 330 corresponds to one of the plurality of elastic members 31, and is configured for receiving the corresponding elastic member 31. In this embodiment, the flat member 33 is made of metal. In other embodiments, the flat member 33 can be made of plastic.

Each elastic member 31 corresponds to one of the keycaps 20 and elastically supports the corresponding keycap 10. Each elastic member 31 is configured for providing a restoring force when the corresponding keycap 10 is pressed by an external force. After the external force on the corresponding keycap 10 is released, the corresponding keycap 10 returns to an original position by the restoring force. Each elastic member 31 includes a pressable portion 310, a contact portion 312, and a connecting portion 313 connecting the pressable portion 310 and the contact portion 312. In this embodiment, the elastic member 31 is made of silastic, and is hollow to loose the weigh of the keyboard 100.

Each pressable portion 310 corresponds to one of the keycaps 20, and receives pressure from the keycap 20. The connecting portion 313 can be polygonal, such as quadrilateral. A connecting arm 3130 extends from one edge of the connecting portion 313. Particularly, in this embodiment, the connecting arm 3130 is formed integrally with the flat member 33 by a double injection process. In this embodiment, the connecting portion 313 is received in the through recess 330, the pressable portion 310 and the contact portion 312 protrude out of the through recess 330. The contact portion 312 faces to the circuit board 50, and contacts the circuit board 50 when the keycap 20 is pressed. Each contact portion 312 has one surface including a pair of first conductive pads 3120. The two first conductive pads 3120 are electrically connected by a conductive line (not shown). The pair of first conductive pads 3120 may be formed as a contact or a trace. In this embodiment, the first conductive pad 3120 is a contact.

The circuit board 50 is disposed on the lower cover 13, and has a surface including at least one pair of second conductive pads 51. The pair of second connected conductive pads 51 may also be formed as a contact or a trace. In this embodiment, the second conductive pad 51 is a trace. Each pair of second conductive pads 51 corresponds to one pair of first conductive pads 3120.

When the keycap 20 is pressed by an external force, the pressable portion 310 of the elastic member 31 is also pressed by the keycap 20, and the elastic member 31 is deformed. Then the contact portion 312 is forced away from the through recess 330, and the pair of first conductive pads 3120 electrically connect to the pair of second conductive pads 51. As such, a circuit is electrically established by the pair of first conductive pads 3120 and the circuit board 50, and an electrical signal is generated by the circuit.

When the external force is released, the elastic member 31 provides a restoring force that pushes the keycap 20 to return to the normal state. Then the electrical circuit, between the pair of first conductive pads 3120 and the circuit board 50 is disconnected.

As described above, the elastic member 31 and the flat member 33 are integrated as a double injection process, a whole height of the keyboard 100 is optimal by heights of the elastic member 31 and the flat member 33. Thus, the keyboard 100 has good ultrathin performance.

It is to be understood, however, that even though numerous has been described with reference to particular embodiments, but the present disclosure is not limited to the particular embodiments described and exemplified, and the embodiments are capable of considerable variation and modification without departure from the scope of the appended claims.

What is claimed is:

1. A keyboard, comprising:
   a pressable structure comprising a flat member and a plurality of elastic members, the flat member defining a plurality of through holes corresponding to the plurality of the elastic members, the plurality of the elastic members integrated with the flat member as a single element by a double injection process; and
   a plurality of keycaps resiliently supported by the plurality of elastic members correspondingly;
   wherein each of the elastic member comprises a pressable portion, a contact portion, and a connecting portion connecting the pressable portion and the contact portion, the pressable portion resiliently supports the keycap, the connecting portion is received in the through hole, the pressable portion and the contact portion protrude out of the through hole.

2. The keyboard of claim 1, further comprising a housing, the housing comprising a top cover, a lower cover corresponding to the top cover, and a receiving room cooperatively defined by the top cover and the lower cover, the receiving room configured for receiving the pressable structure and the plurality of keycaps.

3. The keyboard of claim 2, wherein the top cover defines a plurality of through recesses for receiving the plurality of keycaps.

4. The keyboard of claim 1, wherein the flat member is made of material selected from the group consisting of metal and plastic, and the plurality of elastic members are made of silastic.

5. The keyboard of claim 1, wherein the plurality of elastic member is hollow.

6. The keyboard of claim 1, wherein a connecting arm extends from each of the elastic member and is integrated with the flat member by a double injection process.

7. The keyboard of claim 1, wherein each of the elastic member comprises a pair of first connected conductive pads on a surface of the elastic member, the keyboard further comprises a circuit board including a plurality of pairs of second conductive pads on a surface of the circuit board, the pressable structure is disposed above and parallel to the circuit board; when the keycap is pressed, the pair of first connected conductive pads are electrically connect to a pair of the plurality of pairs of second conductive pads to form a circuit.

8. The keyboard of claim 7, wherein the first conductive pad and the second conductive pad are selected from the group consisting of a contact or a trace.

9. The keyboard of claim 1, wherein a connecting arm extends from the connecting portion and integrates with the flat member by a double injection process.

10. The keyboard of claim 1, wherein the contact portion comprises a pair of first connected conductive pads on one surface of the contact portion, the keyboard further comprises a circuit board including a plurality of pairs of second conductive pads on one surface of the circuit board, the pressable structure is disposed above and parallel to the circuit board, while the pressable portion is pressed, the first connected conductive pads electrically connect to a pair of the plurality of pairs of second conductive pads to form a circuit.

11. The keyboard of claim 10, wherein the first conductive pad and the second conductive pad are selected from the group consisting of a contact or a trace.

12. The keyboard of claim 1, wherein the pressable portion and the contact portion respectively protrude out of opposite sides of the flat member.

13. A keyboard, comprising:
   a plurality of keycaps;
   a flat member defining a plurality of through holes corresponding to the plurality of keycaps;
   a plurality of elastic members correspondingly and resiliently supporting the plurality of keycaps, and the plurality of elastic members integrated with the flat member by a double injection process, each of the elastic member comprising a pressable portion, a contact portion, and a connecting portion connecting the pressable portion and the contact portion, the pressable portion resiliently supporting the keycap, the connecting portion being received in the through hole, the pressable portion and the contact portion protruding out of the through hole, each of the elastic assembly further comprising a pair of first connected conductive portions on one surface of the contact portion; and
   a circuit board disposed under and parallel to the flat member, the circuit board comprising a plurality of pairs of second connected conductive portions, when the keycap being pressed, the elastic member deformed to electrically connect the pair of first connected conductive portions and a pair of the plurality of pairs of second connected conductive portions to form a circuit.

14. The keyboard of claim 13, wherein a connecting arm extends from the connecting portion and integrates with the flat member by a double injection process.

15. The keyboard of claim 13, wherein the pressable portion and the contact portion respectively protrude out of opposite sides of the flat member.

* * * * *